Figure 1:
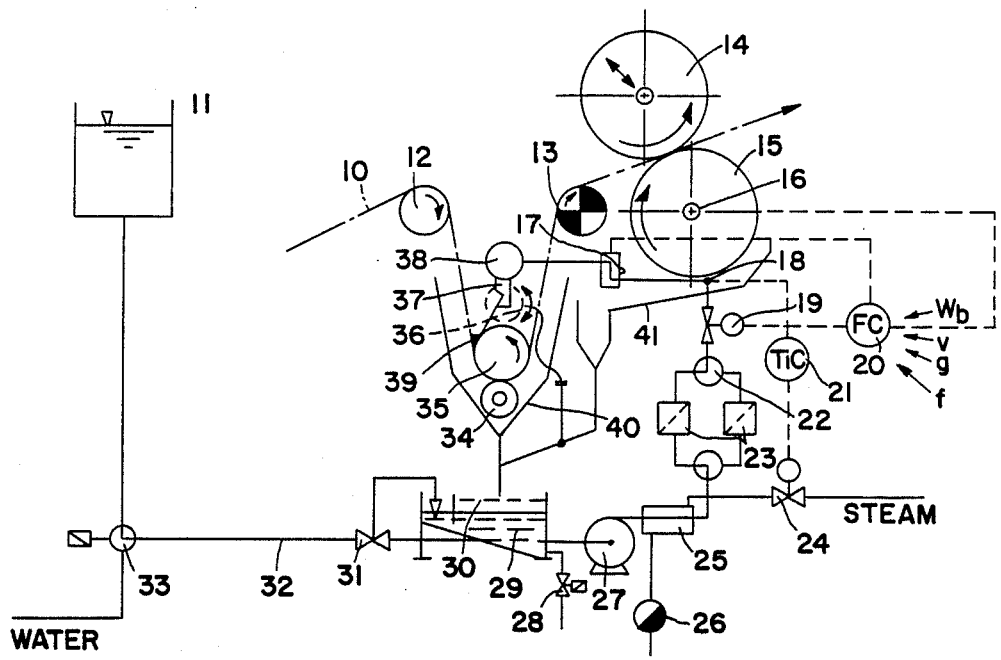

United States Patent [19]

Tischbein

[11] Patent Number: 4,829,791
[45] Date of Patent: May 16, 1989

[54] ARRANGEMENT FOR APPLYING LIQUIDS TO MOVING WEBS OF MATERIAL

[75] Inventor: Claus Tischbein, Buchholz, Fed. Rep. of Germany

[73] Assignee: Babcock Textilmaschinen GmbH, Maschen, Fed. Rep. of Germany

[21] Appl. No.: 794,623

[22] Filed: Nov. 4, 1985

[30] Foreign Application Priority Data

Nov. 3, 1984 [DE] Fed. Rep. of Germany ....... 3440257

[51] Int. Cl.⁴ ............................................. D06B 15/02
[52] U.S. Cl. ................................ 68/22 R; 68/205 R; 118/419
[58] Field of Search ............. 68/22 R, 201, 205, 22 B; 118/419

[56] References Cited

U.S. PATENT DOCUMENTS

| | | | |
|---|---|---|---|
| 1,527,369 | 2/1925 | Meyer | 68/22 R |
| 2,460,206 | 1/1949 | Wentz | 68/22 R X |
| 2,886,403 | 5/1959 | Sellers | 68/22 R X |
| 3,199,317 | 8/1965 | Walsh | 68/22 R |
| 3,692,465 | 9/1972 | Conn et al. | 68/22 R X |
| 3,848,439 | 11/1974 | Lopata | 68/202 X |
| 3,862,553 | 1/1975 | Schwemmer et al | 68/202 X |
| 4,033,153 | 7/1977 | Ahrweiler et al. | 68/205 R |
| 4,084,412 | 4/1978 | Levielle | 68/22 B X |
| 4,199,966 | 4/1980 | Winch | 68/22 R |
| 4,254,644 | 3/1981 | Bartlett et al. | 68/205 R |
| 4,377,080 | 3/1983 | Fox | 68/205 R |
| 4,400,953 | 8/1983 | Driessen et al. | 68/20 Z |
| 4,441,341 | 4/1984 | Otting | 68/205 R |
| 4,463,467 | 8/1984 | Gruber et al. | 68/205 R X |
| 4,485,508 | 12/1984 | Otting | 68/205 R X |
| 4,501,040 | 2/1985 | Biondetti et al. | 68/22 R |
| 4,607,508 | 8/1986 | Sando et al. | 68/22 R |

FOREIGN PATENT DOCUMENTS

| | | | |
|---|---|---|---|
| 1005479 | 4/1957 | Fed. Rep. of Germany | 68/22 B |
| 1241820 | 8/1971 | Fed. Rep. of Germany | 68/205 R |
| 2051654 | 5/1972 | Fed. Rep. of Germany | 68/22 B |

Primary Examiner—Frankie L. Stinson
Attorney, Agent, or Firm—Collard, Roe & Galgano

[57] ABSTRACT

An arrangement for applying liquid such as dye liquor to a moving web of textile material is provided. The arrangement includes a supply reservoir for the dye liquor, a small volume receiving vessel to which the liquor from the supply reservoir is metered, a pump for passing the liquor from the receiving vessel to a distributing element dispoksed above a reversing roll for the material web. The distributing element being adapted to pass the liquor at a liquor to material weight ratio of from about 1.2 to 1.5 into a wedge-like gap formed between the material web running up on the reversing roll and the reversing roll.

9 Claims, 1 Drawing Sheet

ARRANGEMENT FOR APPLYING LIQUIDS TO MOVING WEBS OF MATERIAL

The present invention relates to an arrangement for applying liquids to moving webs of material. More particularly, the present invention relates to an arrangement for applying dye liquors to moving webs of textile material.

Generally, immersion tubs had previously been used for the application of treatment liquors to webs of material. These tubs contain the treatment liquor and the web of material is passed through the tubs containing the liquor. In these tubs, a substantial excess of liquor is offered to the web of material, i.e., in amounts such that only part of the liquor can be absorbed by the material passing through the tub. However, experience has shown that the application of such an excess of liquor as offered by the capacity of the tub is not needed in order to meet the requirements of thorough and even steeping of the material with the dye and for expelling the air from the material as completely as possible.

In such prior art treatment arrangements, when the dye is changed, which occurs with increasing frequency as small batches of different colors are produced, displacers have been used in the liquor tubs. The purpose in using such displacers is to reduce the loss of liquor from such tubs. Such displacers reduce the liquor content of the tubs, but they also greatly narrow down or reduce the cross section of flow. Due to the differences in the substances of the individual dye constituents of a dyeing liquor, this leads to color changes across the width of the web particularly in the case of very wide webs of material, but also in the case of narrow webs. If the liquor that had already been in contact with the material is not intimately mixed or blended with the replenishing liquor, different shades of color may be produced over the length of the web of material. Also, direct contact between fresh liquor and material must be avoided for the same reasons.

It is, therefore, an object of the present invention to avoid the problems caused by uneven application of the treatment liquor to the web of material and, in particular, to ensure that only the amount of treatment liquor that is necessary for achieving the desired treatment effect participates in the treatment, so that the amount of liquor that is removed from the treatment, i.e. that which is not used, as when changing to another color, is limited to a minimum. In this way, the dyeing of small batches of material is more economical than heretofore.

The above object is accomplished in accordance wit the present invention by means of an arrangement or steeping unit in which the liquor is metered and fed from a supply reservoir into a receiving vessel of small volume and then passed from this vessel by means of a pump to a distributing element arranged above a reversing roll for the web of material. No immersion tub for the web of material is thus utilized. By the distributing element, the liquor is fed into the wedge-like gap formed between the web to be steeped running up on the reversing roll and the reversing roll itself. The liquor to weight of material ratio is about 1.2 to 1.5.

It is within the scope of the present invention to successively arrange several reversing rolls in the direction of movement or transport of the web, with distributing elements disposed above each of the reversing rolls.

The distributing elements may be designed as tubes with fan-type or needle-type jets or nozzles disposed therealong and distributed across the width of the web, where individual or several jets or nozzles at the ends of the distributing elements may be shut off by hand or remote control depending on the width of the web. In front of the distributing elements, collecting gutters are pivotably arranged for the liquor, so that the feed of liquor to the web can be interrupted.

Also, the distributing elements may be designed as open distribution gutters with overflows, in which case metering shutters are disposed in the liquor feed conduit leading to the distribution gutters.

It has been found useful if a special distributing or compensating roll is provided downstream of the wedge-like gap between the web and the reversing roll, this roll rests against the reversing roll.

If the web of material enters into treatment in the dry state, an additional small immersion or steeping tub may be arranged beneath the first reversing roll passed by the web in order to assure superior wetting of the web.

A squeezing unit as well as a rotary stretcher preconnected to the squeezing unit may be connected downstream of the reversing roll and distributing element. The distributing element or elements should be associated with splash protection or collecting casings for the liquor splashing or dripping from the web, the casings having drains for returning the liquor to the receiving vessel.

The receiving vessel is provided with a level control valve. At the bottom end of the vessel, a drain is mounted which may be shut off by a valve, and a screen is arranged in front of the inlet duct returning the liquor that dripped from the web to the receiving vessel. Said screen may be a band or belt screen or filter with cleaning nozzles.

A heat exchanger for heating the liquor may be provided in the conduit feeding the liquor from the receiving vessel to the distributing element or elements.

In the liquor feeding system, a liquor quantity control for metering the liquor feed to the distributing elements may be provided. By this control the quantity of liquor is metered depending on the speed of the web (v), the weight of the material (g) and the desired addition of liquor (f) to the material (in percent).

Other objects and features of the present invention will become apparent from the following detailed description considered in connection with the accompanying drawing. It is to be understood, however, that the drawing is designed as an illustration only and not as a definition of the limits of the invention.

Figure 2:
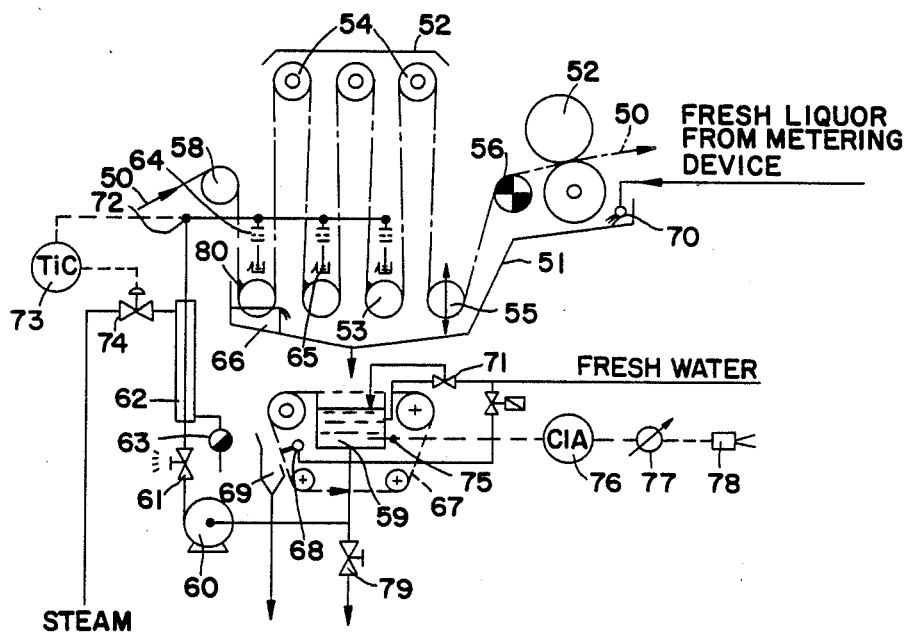

In the drawing, wherein similar reference characters denote similar elements throughout the several views:

FIG. 1 is a schematic drawing of an arrangement according to the present invention of a dye liquor steeping system according to the present invention; and FIG. 2 is a schematic drawing of another embodiment according to the present invention of an arrangement in which very small amounts of liquor participate in the steeping process for pretreating webs of textile material.

Turning now to the drawing, FIG. 1 shows the dye liquor continuously flowing from supply vessel 11 through conduit 32 controlled by valve 33 and into liquor receiving vessel 29, the amount of liquor so fed being controlled or metered by float valve 31. The content of liquor in vessel 29 is maintained as low as possible. Liquor-conveying pump 27 is suitable for conveying the liquor with little foaming of the latter. The pump can be readily cleaned and the amount of flow or the flow rate can be controlled by means of a throttling valve. If the liquor is to be heated, this can be achieved indirectly in heat exchanger 25, which is heated by steam. The heat exchanger includes thermostat 21, temperature sensor 18, control valve 24 and condensate drain 26. The dye liquor continues to flow through change-over cocks 22 and easy-change filters 23 to valve 19 which controls the quantity of liquor. If the filtering efficiency of inlet screen or sieve 30 above vessel 29 is adequate, the interconnected filters may be omitted.

The flow volume or amount of liquor is detected by flowmeter 17 and the measuring signal of the latter is transmitted to flow controller 20. In addition, controller 20 receives as an additional input signal the speed of the web, which is supplied by tach generator 16. In addition, input data required for controller 20 include the weight of the material g (kg/m$^2$) and the desired percent addition of liquor to the material f (in %). These data are input manually or by an electronic, readable data carrier.

By means of distributing tube 38 and fan or needle-type nozzles 37, the liquor is distributed in the wedge-like gap 39 between material web 10 and guide roller 35. So as to permit adjustment to different web widths, individual nozzles 337 at both ends of distributing tube 38 can be shut off by hand or remote control according to the width of web 10.

The material is thoroughly wetted with the liquor by exploiting the kinetic energy of the dye liquor on exiting from nozzles 37, as well as due to the effect of the hydrodynamic pressure in the wedge-like gap between guide roll 35 and web 10.

Intensive complete wetting of the material and displacement of the air contained therein is additionally promoted by intensifying roll 34.

Additional time for penetration is available to the dye liquor while the web travels from intensifying roll 34 via the stretching roll 13 (stretching the web widthwise) to squeezing rolls 14 and 15. Usefully, squeezing roll 14 is designed as a variflex roll. The liquor removed from the material in the squeezing step (equal to about 20 to 40% of the weight of the material) is partially returned via the material to the guide roll 35, where it promotes thorough wetting, or to vessel 29 via baffle 41 with collecting funnel and screen 30. The liquor not absorbed by the material in wedge-like gap 39 or in the marginal zones of liquor feed is also returned to vessel 29 via the screen. In vessel 29 and by pump 27 as well as on its way to distributing tube 38, the liquor continuously fed into vessel 29 is intensively blended with the recycled liquor so that differences in concentration are thus compensated.

All liquor-conducting elements are arranged in a way such that flushing water is completely drained by means of valve 28. During this draining period or while in the resting position, valve 33 is set in a position such that any after-flow of liquor or flushing water is prevented.

At the commencement of a dyeing operation, the liquor-conducting system is filled with dye liquor. For this purpose, the path of the liquor is cleared by valve 33. Valve 31 opens until the level set in vessel 29 has been reached. A material speed simulated by controller 20 causes the pump to start operating and valve 19 opens.

The liquor exiting from the nozzles is collected by the pivotable collecting gutter 36 and returned to vessel 29. No material or lead material need be run through the system during this operation. Even if lead material is passed through the foulard, it is not wetted by the liquor. Once the correct material speed is reached, the system is switched to the tach generator 16. Once the material arrives, swivelling gutter 36 is swung away and the liquor flows onto the material.

When the dye is changed, the dye liquor is drained with the idler rollers running or at a standstill. For this purpose, valve 28 opens, valve 33 closes off the flow of liquor and with a delay, switches to the feed of flushing or rinsing water. Flushing of the liquor-conducting parts takes place simultaneously with the automatic cleaning of all other parts of the foulard that were wetted by the dye liquor. On completion of the flushing cycle, valve 33 shuts off the feed of water and liquor and the system is drained by means of valve 28. Tub 40 serves only as a trough for collecting liquor and as a splash protection.

The steeping unit or arrangement according to FIG. 2 includes a housing 51 which may be open or closed. If the housing is open, a splash protection 52 is required. The housing accommodates non-driven material guide rollers 53 and material guide rollers 54, the latter being driven via relax. A jockey roller 55 is provided as the last roller, followed in the direction of web travel by a rotary stretcher 56 (stretching the web crosswise) and a squeezing unit 57.

The material is passed via roller 58 into the steeping or impregnating unit. The liquor is sucked from the small receiving vessel 59 by pump 60 and conveyed into distributing gutters 65 by way of regulating valve 61, steam-heated heat exchanger 62 and metering shutters 64. The gutters assure an even distribution of the liquor across the total width of the material. The liquor is passed by the baffles on the gutters into the wedge-like gap 80 between material 50 and rollers 53. The gutters can be tilted for rapid draining for cleaning purposes. Furthermore, said gutters can be set in an exactly horizontal position.

The incoming material is thoroughly steeped in the small tub 66. Said tub is especially important if the material is received in the treatment plant in the dry state.

The amount of liquor conveyed by pump 60 should come to only about 120 to 150% of the dry material weight passing through the plant, i.e., the amount of liquor dripping from the material and overflowing from the tub 66 should be low. This amount may be adjusted by hand or with the help of a control device with valve 61.

The excess liquor together with the liquor squeezed from the material by the squeezing unit 57 and the fresh liquor fed to the return or reflux plate of the squeezing unit flows into receiving vat 59. The liquor flowing into vat 59 is filtered b band filter 67 since it may contain a great amount of fluff (e.g. when raw or crude material is steeped).

The continuously or periodically revolving filter band is cleaned by means of fresh water (or filtered waste water) flowing through nozzles 68. The fluff is collected in funnel 69.

The concentrated fresh liquor is fed or metered in proportion to the material weight throughput by distributing tube 70 and the reflux plate of the squeezing unit. An automatic dosing device serves for the metering of the liquor.

Fresh water is fed to vat 59 by means of float valve 71 so as to maintain the level of liquor in the vat constant. If the liquor is to be heated, the temperature of the liquid is measured by means of sensor 72 and controlled by controller 73 which controls the setting of steam valve 74. For controlling the metering or dosing device, the conductivity of the liquor can be measured with conductivity measuring electrode 75 based on the NaOH-content of the liquor and indicated with measuring device 76 via indicator device 77. Deviations from the nominal value can be signaled by means of acoustic or optical alarm 78.

The value of conductivity of an impregnating liquor in the steady condition may serve for setting or adjusting the correct first-load or first-charge concentration in repeat operations or treatments.

While only two embodiments of the present invention have been shown and described, it will be obvious that many changes and modifications may be made thereunto without departing from the spirit and scope of the invention.

What is claimed is:

1. An arrangement for applying liquid such as dye liquors to a moving web of material, comprising:
    (a) a supply reservoir for said liquid;
    (b) a small volume receiving vessel;
    (c) means for metering and feeding said liquid from said supply reservoir to said receiving vessel;
    (d) a distributing element disposed above a reversing roll for said web of material including a tube having a plurality of fan type nozzles disposed therealong so as to be distributed across the width of the material web, said distributing element passing said liquid at a liquid to material weight ratio of from about 1.2 to 1.5 into a wedge-like gap formed between the material web running up on the reversing roll and the reversing roll;
    (e) a collecting gutter pivotably arranged in front of the distributing element for collecting liquid and preventing the liquid from being applied to the web of material;
    (f) pump means for passing said liquid from said receiving vessel to said distributing element;
    (g) control means for controlling the feed of liquid to said distributing element depending on the speed of the web, weight of the material and desired addition of liquid to the material; and
    (h) a squeezing unit and a rotary stretcher preconnected thereto, connected downstream of the reversing roll.

2. The arrangement as defined in claim 1, which comprises a plurality of reversing rolls arranged in series in the direction of motion of the material web, said reversing rolls being successively passed by the web of material, and a distributing element disposed above each of said reversing rolls.

3. The arrangement as defined in claim 1, which further comprises means for on-off control of the nozzles at the end of the distributing element in dependence on the width of the material web.

4. The arrangement as defined in claim 1, which further comprises an intensifying roll downstream of the wedge-like gap between the material web and the reversing roll, said intensifying roll resting against said reversing roll.

5. The arrangement as defined in claim 1, which further comprises splash protection casings and collecting casings for the liquid splashing or dripping from the web of material are associated with the reversing roll and with the squeezing unit and the rotary stretcher, said casings having drains for feeding the liquid into the receiving vessel.

6. The arrangement as defined in claim 5, which further comprises a screen arranged at said receiving vessel to screen the liquid dripping off the material web.

7. The arrangement as defined in claim 1, which further comprises a level-controlling valve for the receiving vessel.

8. The arrangement as defined in claim 7, which further comprises a drain provided at the bottom end of the receiving vessel, said drain being controlled by a shut off valve.

9. The arrangement as defined in claim 1, which further comprises a heat exchanger fir heating the liquid provided in the liquid feed from the receiving vessel to the distributing element.

* * * * *